United States Patent [19]
Gratton et al.

[11] 3,867,253
[45] Feb. 18, 1975

[54] NUCLEAR REACTORS

[75] Inventors: Charles Peter Gratton, Dorchester; Alan Thomas Hoper, Weymouth; Alan Kenward, Dorchester, all of England

[73] Assignee: United Kingdom Atomic Energy Authority, London, England

[22] Filed: Oct. 6, 1971

[21] Appl. No.: 187,182

Related U.S. Application Data

[63] Continuation of Ser. No. 796,988, Feb. 6, 1968, abandoned.

[52] U.S. Cl............... 176/40, 176/59, 176/61, 176/73
[51] Int. Cl............................................. G21c 3/04
[58] Field of Search........... 176/73, 83, 45, 49, 32, 176/50, 61, 59

[56] References Cited
UNITED STATES PATENTS

| | | | |
|---|---|---|---|
| 3,177,123 | 4/1965 | Huet | 176/83 |
| 3,287,910 | 11/1966 | Silverstein | 176/45 |
| 3,309,279 | 3/1967 | Ritz | 176/73 |
| 3,368,946 | 2/1968 | Jenssen | 176/83 |
| 3,389,053 | 6/1968 | Chamberlain et al. | 176/32 |
| 3,389,054 | 6/1968 | Kovacic | 176/49 |
| 3,406,090 | 10/1968 | Dunn et al. | 176/73 |

FOREIGN PATENTS OR APPLICATIONS

| | | | |
|---|---|---|---|
| 845,804 | 8/1960 | Great Britain | 176/73 |
| 946,901 | 1/1964 | Great Britain | 176/73 |

*Primary Examiner*—Harvey E. Behrend
*Attorney, Agent, or Firm*—Larson, Taylor and Hinds

[57] ABSTRACT

In a nuclear reactor employing porous fuel irregularities of coolant flow can occur through the porous fuel at different parts of the core. According to the present invention means are provided to lessen the non uniformity of coolant flow and typically sleeves with control orifices in their walls are employed to regulate the coolant flow through porous fuel tubes.

5 Claims, 7 Drawing Figures

PATENTED FEB 18 1975
3,867,253
SHEET 1 OF 3
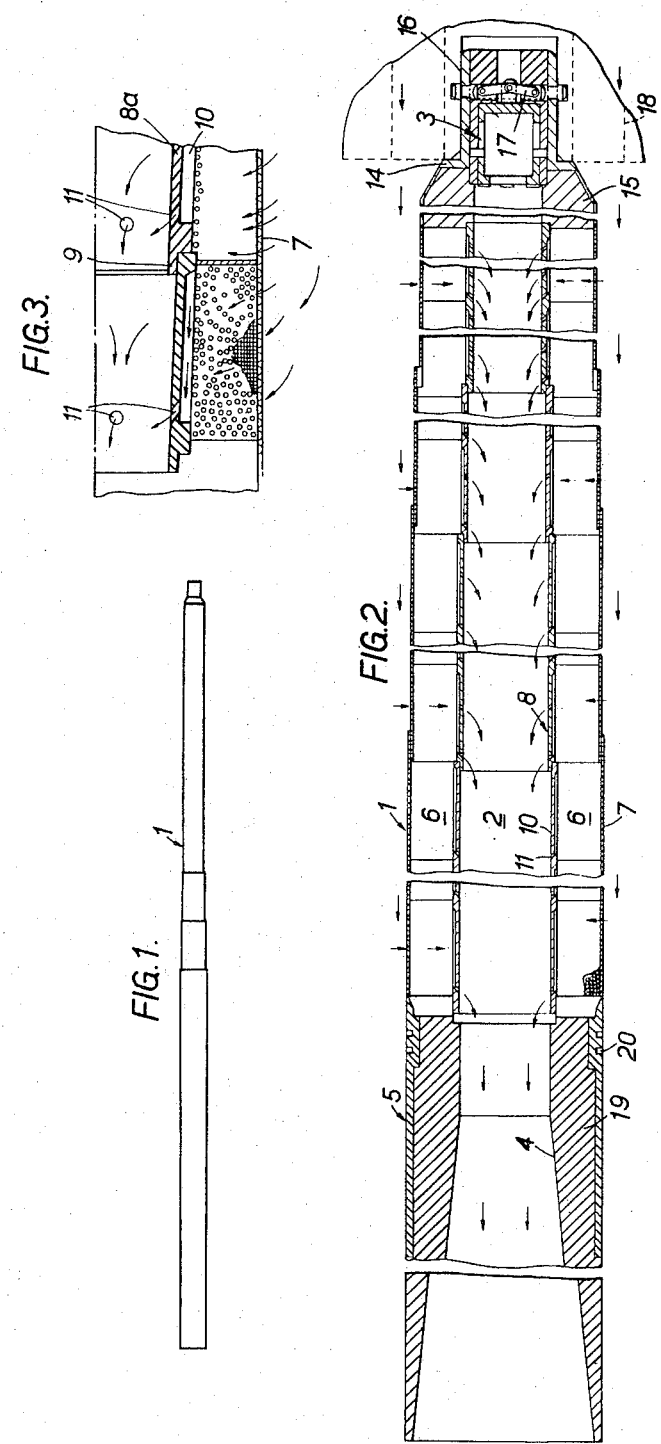

NUCLEAR REACTORS

This is a continuation of application Ser. No. 796,988, filed Feb. 6, 1968, now abandoned.

BACKGROUND OF THE INVENTION

This invention relates to nuclear reactors employing porous fuel which in this context means nuclear fuel which provides a structure containing interconnected pores through which coolant can pass. The fuel may be in the form of a porous layer or bed supported in a manner to constitute a fuel element. In such an arrangement the total heat transfer surface presented to the coolant is rather high as compared with the surface presented for example by rod-like can of nuclear fuel pellets and hence only a shallow depth of porous bed is necessary in order to raise the coolant to the required temperature. The attendant coolant pressure drop across the bed need not therefore be very large and in fact it can be made quite small.

However, owing to the fact that the beds are shallow there must be a number of these beds arranged in parallel in order to build up a critical mass at the reactor core and to avoid excessive voidage it is convenient to lead coolant to and withdraw it from the faces of the beds by ducts (herein called inlet and outlet ducts respectively) which run in a direction parallel to and are bounded in part by the respective faces of the beds. There will be pressure gradients along these coolant ducts due partly to frictional pressure losses but more importantly due to momentum changes. In the outlet ducts the momentum of the coolant must be made to increase so that there is a pressure drop in the flow direction, which is added to the friction effect whereas, in the inlet ducts axial momentum decreases and normally a rise in pressure occurs in the flow direction. This rise may offset or even outweigh the pressure drop induced by friction. With these vagaries of pressure change along the faces of the bed there is little chance that the cooling of the fuel will be optimised, bearing in mind that the rate of heat generation in the fuel is not necessarily uniform.

SUMMARY OF THE INVENTION

According to the present invention there is provided a nuclear reactor having fissile fuel arranged as a porous bed through which a fluid coolant is passed to remove heat from the fuel, the coolant being introduced to one side of the bed and removed from the other side and means providing a controlled distribution along the bed of coolant permeation through the bed so as to control the apportionment of the coolant.

Such apportionment of the coolant can be carried out with the aim of producing a more uniform coolant distribution along the bed or a non-uniform coolant distribution to match a correspondingly non-uniform heat generation. It can be achieved by adopting one of the two general procedures, namely the flow resistance of the bed may be modified or secondly the fuel bed and its inlet and outlet coolant ducts may be arranged to cause such a pressure gradient along the ducts as will automatically give the desired proportionment.

In one embodiment of the first procedure, the coolant distribution is controlled by providing a member which bounds one face of the fuel bed and which presents the major flow resistance in the coolant flow path, said resistance being varied along the face of the bed.

In its second procedure which has one advantage in that none of the driving pressure difference need be deliberately dissipated, the effect may be achieved by arranging the inlet and outlet ducts on the respective faces of a porous bed to reduce in flow area the inlet duct or outlet duct where the flow is small so that in a concurrent flow system, the mass flow of coolant is reduced in the ducts and hence the pressure gradient along the duct is reduced.

Of course any one reactor core may employ porous fuel elements which incorporate more than one of the above means of achieving a wanted distribution.

DESCRIPTION OF THE DRAWINGS

In the drawings:

FIG. 1 shows a fuel element in outside elevation;

FIG. 2 shows an axial cross section of FIG. 1 to an enlarged scale;

FIG. 3 is a fragmentary view of part of FIG. 2 to a further enlarged scale;

DESCRIPTION OF THE PREFERRED EMBODIMENTS

Figure 4:
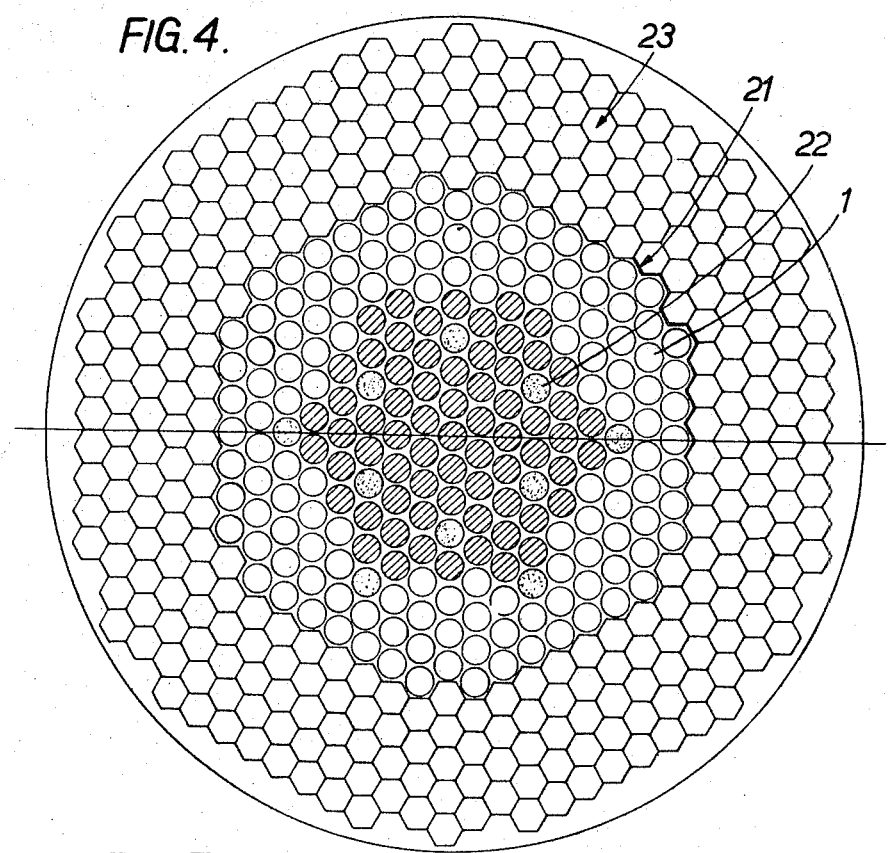
FIG. 4 is a plan view of a part of a fast reactor core whose fissile region is made up of fuel elements generally of the form shown in FIG. 1.

Referring now to FIGS. 1–3 which show a fuel element for making up into the gas cooled fast reactor configuration of FIG. 4. The fuel element depicted in a horizontal attitude in FIGS. 1 and 2 is designed for use with its axis vertical and comprises a composite tubular body 1 having a central bore 2 which for the most part is parallel walled although not of uniform diameter. One end, intended as the lower end, of the bore is closed by an end fitting 3 whilst at the top end the bore is made divergent in the flow direction at 4 by means of a tubular end fitting 5. Between these fittings 3, 5 the body 1 is composed of a tubular porous bed 6 of particles, the kernels of which are of nuclear fuel. Each kernel bears a coating of material which will maintain the integrity of the particles in a fast neutron flux and will remain impermeable to fission products so that coolant sweeping over the coating surfaces as it passes through porous bed will not become contaminated. The bed 6 is actually made up of a number of short porous walled cylindrical artefacts or cartridges of coated particles as aforesaid bonded or sintered together in a manner which allows the coolant to pass through interspaces between the particles at least in a direct radial sense. The artefacts are retained between porous walls in the form of coaxial sleeves or tubular elements of which the outer sleeve or tubular element 7 is of stainless steel mesh of fine guaze of porosity at least as great as the fuel artefact. Such a material as is currently used in filters is suitable and to obtain sufficient length of mesh a number of short tubular length are lap jointed at their ends as shown. The inner sleeve or tubular element 8 is of ceramic substantially impermeable to gases and is also made up of a number of short lengths of tube 8a whose adjacent rims 9 lap one another.

As is evident from the drawings, the inner and outer sleeves or tubular elements are generally parallel meaning only that they extend in the same direction as opposed, for example, to being perpendicular to each other, but as is evident from the specification and drawings, this does not require that they be perfectly parallel to each other.

The outer face of each tube 8a is relieved over a portion of its length to define a shallow annular groove 10 (shown more clearly in FIG. 3). A number of ports 11 through the wall of each tube 8a communicate the groove with the bore 2, the ports being inclined to direct the flow into the bore in the axial flow directions.

The axial length of each cartridge is such as to span the length of one groove 10 and the cartridge being a sliding fit on full diameter portions of the inner sleeves.

In operation, the path for coolant lies from the outside of the element radially inwards through the stainless steel mesh 7 thence through the pores of the adjacent fuel cartridge 6, where it becomes heated, into the annular groove 10 between the sleeve 8 and the inner face of the fuel cartridge. From this space the coolant, now hot, passes through the adjacent one of the inclined ports 11 into the bore 2 whence it flows axially as indicated by the arrows to the divergent passage in the top end fitting described below.

The composition of the fuel kernel in the cartridges depends upon its position axially of the fuel element. In a gas cooled fast reactor the space in the upper and lower thirds of the fuel element is occupied by fertile fuel material whilst the middle third is fissile material.

As incidated in FIG. 4 each element is adapted so that a number of such elements can be arranged side by side axes parallel to form the reactor core and the end fittings are adapted to this end. The bottom end fitting 3 comprises a metal casing 14 which is secured to the lowermost sleeve of the stainless steel mesh 7. At this region, the casing has an internal shoulder which supports a graphite bush 15 which is counter bored to receive the bottom end of the lowermost of the sleeves 8. Below the internal shoulder, the casing diameter is reduced to form a spigot 16. Within this spigot a latch mechanism has a pair of retractable latches 17 which can be expended by manipulation of a long reaching tool inserted down the tube bore 2 in order to latch the spigot of the element into a grid (shown in dotted outline at 18). The top end fitting 5 is in the main a tubular extension of the same diameter as that of the fuel element but carries a graphite bush 19, which in common with the bush 15 of the lower end fitting 3 acts as a neutron reflector. On its periphery, the top end fitting 5 carried piston ring type seals 20.

When a number of the elements shown in FIG. 1 are fitted, axes parallel, into top and bottom support grids they may occupy an area bounded by line 21, a hexagon, when viewed in plan in FIG. 4, control rods 22 being substituted for certain fuel elements in the portions shown, and forming the fissile core and "axial" blankets. The radial blanket comprises a plurality of hezagon clusters of fertile fuel pins indicated generally at 23.

So far as the fissile core and "axial" blanket are concerned the path for coolant is as follows: the coolant is supplied from an inlet area through holes 18 in the bottom support grid to enter the interspaces between the elements 1, wherein it passes axially along the interspaces and in confined by seals 20 against the top grid. The coolant passes radially in several directions to pass through the porous fuel cartridge into the grooves 10 in the sleeves 8. From the grooves 10 the coolant passes through the holes 11 into the bore 2 where it again picks up axial momentum and flows axially through the bore leaving the bore by the divergent passage in the bush 19, converting some of its kinetic energy to pressure in the process. The gas issuing from the tops of the elements passes into a hot box (not shown) and thence into a hot gas utilisation plant which may be a heat exchanger heating a secondary coolant or a gas turbine.

It will be appreciated that in the arrangement described, cool gas entering the core is shared by a number of porous paths in the form of intersticial passages between coated fuel particles. Apart from manufacturing tolerances which result in giving different flow impedances the axial pressure gradients in the bores 2 and the interspaces between elements will give rise to inequalities of coolant distribution. However the provision of the predetermined variations in porosity of the inner graphite sleeve in a manner which compensates either for manufacturing tolerances and/or for the effect of axial pressure gradients on pressure drop across the fuel will reduce inequalities in coolant distribution.

Moreover, of the pressure gradients along the two paths (i.e. the interspaces between elements and the bores of the elements) the greater will be that present in the bore. The effect of this is mitigated according to the invention by the shaping of the boundaries of the coolant flow paths in a manner which reduces the flow area at the end of the axial inlet path leading coolant over the outside of the elements and also at the beginning of the axial outlet path, i.e., the upstream end of the bore 2. The amount of reduction is small and barely perceptible in FIG. 2. It is however accomplished in the case of the inlet flow path and the bore of the element by lapping short lengths of tube, which, starting from the bottom end fitting, progressively increase in diameter.

Figure 5:
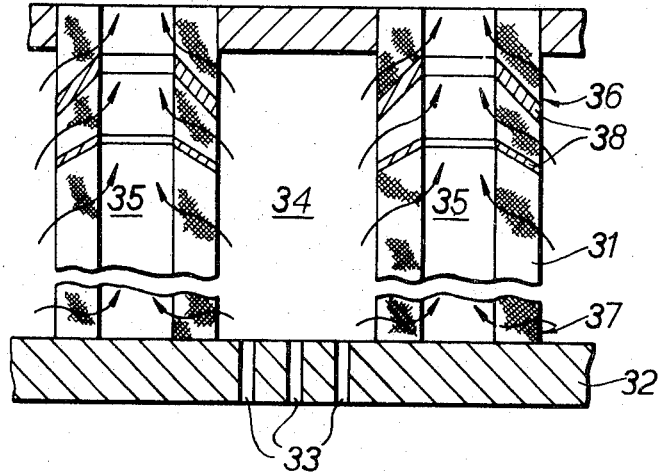
FIG. 5 shows a modified form of a tubular fuel element in axial cross section with its coolant flow pattern.

In the embodiment of the invention, described with reference to FIG. 5 the fuel element 31 is tubular and mounted on a diagrid 32 with its axis vertical. Holes 33 in the diagrid admit gas coolant to the inlet ducts 34 between adjacent fuel elements whence it passes over the surfaces of the porous fuel and percolates through the fuel into the fuel element bore which forms the outlet duct 35. From the duct 35 the hot gas passes to a heat exchanger (not shown). As the pressure along the inlet duct 34 falls little, or may rise, and that along the outlet duct 35 falls appreciably in the flow direction, there is a greater driving pressure difference between ducts 34 and 35 at the downstream ends 36 than at their upstream end 37 and hence, with the pressure drop through the porous wall of the fuel element being presumed uniform, there is a tendency for a larger proportion of coolant to traverse the wall at the downstream end 36 leaving the upstream end 37 starved of coolant.

To avoid this effect conical baffles impervious to coolant are located as at 38 so that at this region the coolant percolating the wall is obliged to follow a path through the fuel of increased length. This in effect increases the pressure drop through the fuel at this location so compensating for the larger driving pressure difference.

Figure 6:
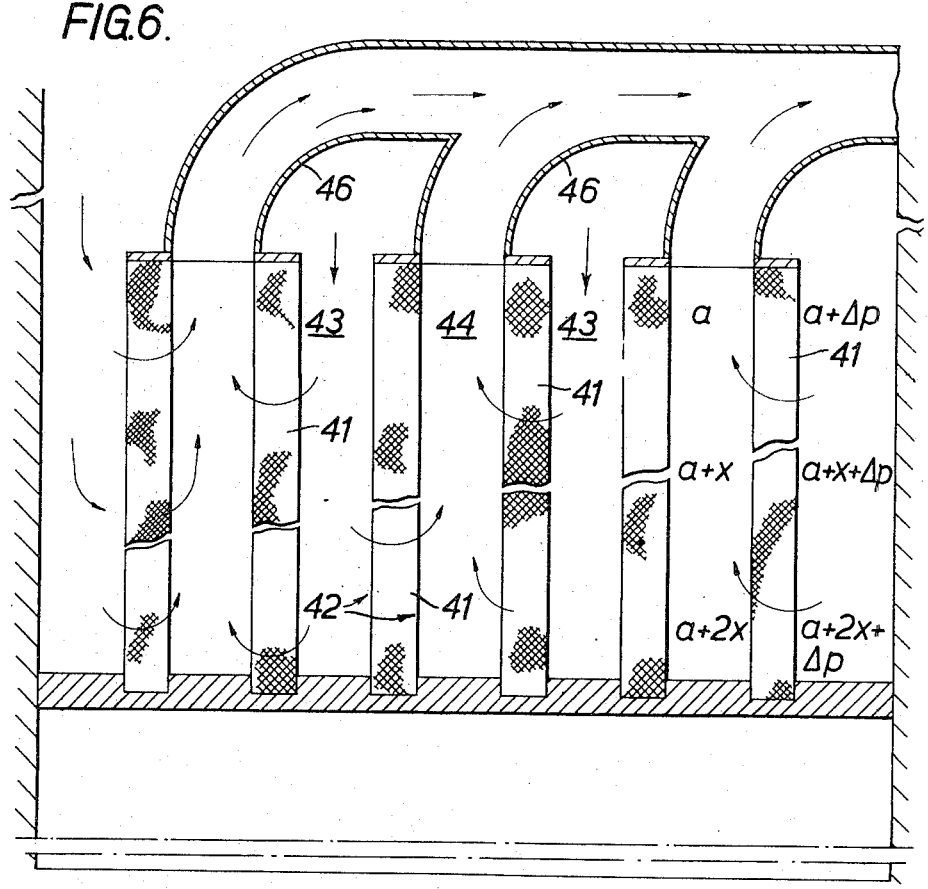
FIG. 6 shows diagrammatically a number of tubular fuel elements mounted between coolant inlet and outlet plenums.

An embodiment of the invention will now be described with reference to the diagrammatic drawing FIG. 6 which shows part of a gas cooled reactor core incorporating elongated porous beds of nuclear fuel.

In the drawing the nuclear fuel is arranged in a number of tubular beds 41 suitably supported, e.g., between coarse stainless steel mesh 42, with their axes vertical. The tubular beds 41 are spaced apart so as to define coolant inlet flow ducts 43 between adjacent beds, the outlet flow ducts being formed by the core 44 of each tube. The space above the inlet ducts 43 forms an inlet plenum or manifold for coolant and at the same end the outlet ducts constituted by bores 44 discharge into conduits 46.

The inlet and outlet ducts 43, 44 are so proportioned that the pressure rise along the inlet ducts 43 in the direction of flow is balanced by the fall in pressure in the counter flowing outlet gas. Thus the static pressure difference between inlet and outlet ducts at all positions on opposite sides of the porous wall may remain substantially constant. Given uniform porosity the coolant flow should be about the same across the fuel at all points along the ducts. Small adjustments to the pressure balance, or to the flow resistance, may be made to match coolant flow to heat rate along the bed.

As an example of what is intended a series of algabraic values has been given in the right-hand fuel bed in the drawing where the symbols $a$, $a+x$ etc. indicate relative values of static pressures in arbitrary units and $\Delta p$ in the pressure drop through the bed.

As the coolant fluid enters inlet duct 43 its mass velocity falls and its static pressure rises in consequence, although the rise is restricted by subtraction of fluid passing into the porous wall. In the outlet duct 44, the mass velocity increases in the flow direction and the static pressure drops.

The small pressure difference which the tubular bed has to withstand allows a porous bed to be formed without great regard to its structural strength and this avoids the need for possibly having to include structural material in the bed which could introduce parasitic resistance to flow. As it is, the beds may be made simply from coated particles of nuclear fuel formed into a porous agglomeration of tubular form with the minimum, or no, support structure. Since the difference between inlet and outlet pressures is only the pressure $\Delta p$ across the bed, the pumping power requirements are minimised.

Figure 7:
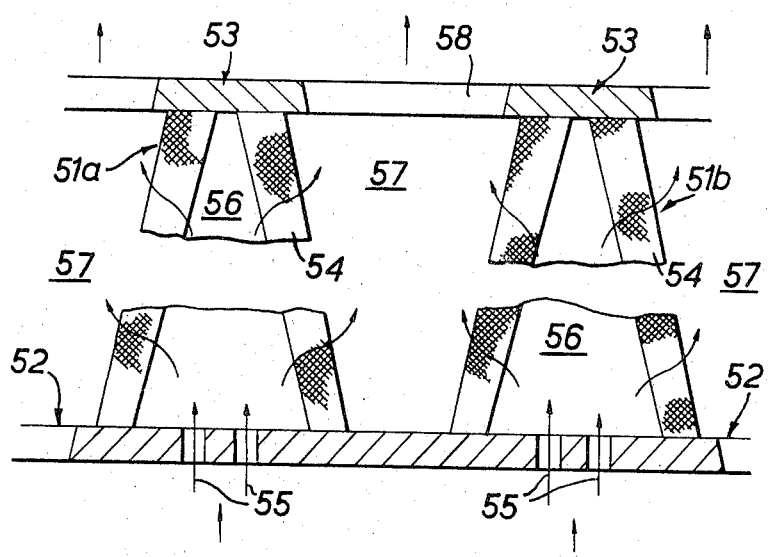
FIG. 7 is a similar view to that shown in FIG. 5 and 6 showing a further, modified, fuel element.

In FIG. 7 the fuel elements 51a, 51b are each shaped as truncated hollow cones whose bases seat on a diagrid 52. The upper ends of the cones are closed by plates 53 and their side walls 54 are comprised of porous nuclear fuel. Holes 55 in the diagrid admit coolant into the converging coolant inlet ducts 56 formed by the element interior. The coolant flowing axially into the duct 56 which reduces in cross sectional area in the flow direction and so restricts the pressure rise. The coolant passes through the pores in the walls 54 to enter the outlet duct 57 formed between the outer surfaces of adjacent cones 54. The divergent outlet duct 57 afforded by the adjacent cone surfaces tends to reduce the falling pressure gradient towards the outlet 58.

The cone angles are arranged to be such that the convergent inlet ducts 56 reduce the pressure rise which one would associate with a fluid discharged into a cavity upstream of a flow impedence. At the same time the divergent outlet ducts 57 help to reduce the momentum loss in the entrainment of coolant from the outlet side of the duct wall 54. The pressure drop across the bed will increase along the fuel element but due to the decreasing mean diameter and increasing bed thickness the bed resistance can be arranged to compensate and give the required distribution of mass flow through the bed.

We claim:

1. A gas cooled fast nuclear reactor having a pair of generally parallel first and second grid plates, a plurality of elongated tubular coolant permeable fuel assemblies extending between said grid plates from one to the other, the sides of the grid plates facing away from each other defining inlet and outlet areas, each assembly including, inner and outer generally parallel perforated tubular elements and a porous fuel bed of fission product retaining fuel particles contained between the tubular elements along a major part of the length of the assembly, an elongated coolant outlet face formed by the bore wall of the inner tubular element of the tubular assembly, an elongated coolant inlet face formed by the outer wall of the outer tubular wall of the tubular assembly; elongated coolant supply channels adjacent and bounded in part by said inlet faces and extending along the length of said inlet faces, the supply channels including means for constraining all of the gas entering the supply channel to flow through the fuel bed, means for introducing coolant to the supply channels from the inlet area through said first grid, said supply channels thus defining a coolant flow path for coolant entering the supply channels to flow in series along the inlet faces and in parallel flow relation into and through the porous fuel beds and through the outlet faces, elongated coolant delivery channels adjacent and formed in part by said outlet faces and extending along the length of said outlet faces to receive gas from said coolant flow path, the delivery channels including means for contraining all of the gas entering the delivery channels through the fuel bed to flow outwardly through discharge oepnings, the coolant delivery channels terminating at said discharge openings which open into the outlet area beyond the said second grid, said delivery channels thus defining a path for the coolant to flow along the outlet faces to said discharge openings, the flow area of the delivery channels into the outlet area being substantially as large as the flow area of the delivery channels at the downstream end thereof, the increasing size of the coolant delivery channels from the upstream end thereof to the discharge opening constituting a means for decreasing the velocity of the coolant and hence increasing the pressure of the coolant along the length of the coolant delivery channels in the flow direction, and thus reducing the difference in the pressure drop across the porous fuel bed along the length of the elongated fuel assembly.

2. A nuclear reactor as claimed in claim 1, in which at least one of the perforated tubular elements has a pattern of perforations for varying the resistance to flow of coolant through the fuel bed from the inlet faces to the outlet faces thereof at different regions along the bed.

3. A nuclear reactor as claimed in claim 2, in which one of said tubular elements includes a porous member which covers one face of the fuel bed and which presents a major flow resistance to the coolant flow path between said faces and means for varying the amount of said flow resistance presented by such member along the length of the face of the bed to which it is applied.

4. A nuclear reactor as claimed in claim 3, wherein the fuel bed within each fuel assembly is in the form of an elongated tubular member having an axial bore passing therethrough, and said porous member being a generally cylindrical porous ceramic tube applied to one periphery of the tubular member, and perforations in said porous tube, the means for varying the flow resistance comprising variations in the size of the perforations along the length of the tube.

5. A nuclear reactor as claimed in claim 4, in which the tubular member is bounded on its inner and outer cylindrical faces by porous sleeves, the porosity of at least one of which sleeves increases progressively from one end of the tubular member to the other end thereof and means at each end of the tubular member for inhibiting axial flow therein, whereby the coolant is constrained to flow radially therethrough.

* * * * *